US012137789B2

(12) United States Patent
Ogawa et al.

(10) Patent No.: US 12,137,789 B2
(45) Date of Patent: Nov. 12, 2024

(54) PRINTING APPARATUS AND CONTROLLING METHOD

(71) Applicant: CANON KABUSHIKI KAISHA, Tokyo (JP)

(72) Inventors: Naoya Ogawa, Kanagawa (JP); Akira Sugiyama, Kanagawa (JP); Soma Nakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 301 days.

(21) Appl. No.: 17/695,887

(22) Filed: Mar. 16, 2022

(65) Prior Publication Data

US 2022/0304448 A1 Sep. 29, 2022

(30) Foreign Application Priority Data

Mar. 26, 2021 (JP) ................................ 2021-053659

(51) Int. Cl.
*A45D 34/04* (2006.01)
*A45D 29/22* (2006.01)
(Continued)

(52) U.S. Cl.
CPC ............ *A45D 34/04* (2013.01); *A45D 29/22* (2013.01); *B41J 3/407* (2013.01); *A45D 2029/005* (2013.01)

(58) Field of Classification Search
CPC ...................................................... A45D 29/22
See application file for complete search history.

(56) References Cited

U.S. PATENT DOCUMENTS 2,381,197 A * 8/1945 Zalkind .................... B41L 3/02 462/78
3,291,655 A * 12/1966 Gill ........................ C22C 38/22 420/110
(Continued)

FOREIGN PATENT DOCUMENTS

JP 2016116597 A * 6/2016 ............. B41J 3/407
JP 2016150092 A * 8/2016

OTHER PUBLICATIONS

Soma Nakai, et al., U.S. Appl. No. 17/706,728, filed Mar. 29, 2022.
(Continued)

*Primary Examiner* — Ted W Barnes
(74) *Attorney, Agent, or Firm* — VENABLE LLP

(57) ABSTRACT

A printing apparatus includes a printer to perform printing on a first target object and a second target object by ejecting a liquid in a first direction, a first finger holder on which the first target object is placeable, and a second finger holder on which the second target object is placeable. A first adjustor adjusts a first distance in the first direction between the first target object placed on the first finger holder and the printer, and a second adjustor adjusts a second distance in the first direction between the second target object placed on the second finger holder and the printer. In addition, a controller controls at least one of the first adjustor and the second adjustor such that the first distance is smaller than the second distance in a case of printing on the first target object. The first adjustor and the second adjustor use a same motor as a drive source.

17 Claims, 21 Drawing Sheets

(51) Int. Cl.
*B41J 3/407* (2006.01)
*A45D 29/00* (2006.01)

(56) References Cited

U.S. PATENT DOCUMENTS

| | | | | |
|---|---|---|---|---|
| 6,286,517 | B1 * | 9/2001 | Weber | A45D 29/00 132/73 |
| 9,808,068 | B2 * | 11/2017 | Yamasaki | A45D 29/22 |
| 9,943,155 | B2 * | 4/2018 | Hori | A45D 29/00 |
| 9,955,764 | B2 * | 5/2018 | Yoshigai | A45D 29/00 |
| 10,292,475 | B2 * | 5/2019 | Yamasaki | G06K 15/021 |
| 10,875,324 | B2 * | 12/2020 | Yasumoto | A45D 29/00 |
| 2012/0147113 | A1 * | 6/2012 | Yamasaki | B41J 3/407 347/104 |
| 2013/0247929 | A1 * | 9/2013 | Namai | A45D 29/00 132/200 |
| 2014/0267517 | A1 * | 9/2014 | Yamasaki | B41J 3/4073 347/101 |
| 2016/0088197 | A1 * | 3/2016 | Yamasaki | G06T 7/55 348/142 |
| 2016/0158983 | A1 * | 6/2016 | Hepler | B29C 45/401 425/556 |
| 2016/0167396 | A1 * | 6/2016 | Chang | B41J 3/4073 347/37 |
| 2016/0174680 | A1 * | 6/2016 | Yamasaki | B41J 3/407 132/200 |
| 2017/0181522 | A1 * | 6/2017 | Yoshigai | A45D 29/22 |
| 2017/0273433 | A1 * | 9/2017 | Hori | A45D 34/04 |
| 2019/0299683 | A1 * | 10/2019 | Takakusa | B41J 19/14 |
| 2020/0207080 | A1 * | 7/2020 | Hayashi | B41J 2/04505 |

OTHER PUBLICATIONS

Yuka Tani et al., U.S. Appl. No. 17/706,670, filed Mar. 29, 2022.
Keisuke Arita et al., U.S. Appl. No. 17/690,113, filed Mar. 9, 2022.

* cited by examiner

PRINTING APPARATUS AND CONTROLLING METHOD

BACKGROUND OF THE INVENTION

Field of the Invention

The present invention relates to a printing apparatus that performs printing, and a controlling method therefor.

Description of the Related Art

Japanese Patent Laid-Open No. 2016-150092 discloses a technique for improving printing accuracy by setting fingers inside a printing apparatus and aligning positions in a height direction of nails being equivalent to distances from a print head.

According to the method of Japanese Patent Laid-Open No. 2016-150092, a nail that does not undergo printing is located at the same height as a nail that undergoes printing. As a consequence, if the finger with the nail not undergoing the printing is moved, the nail not undergoing the printing may come into contact with the print head in the course of a scanning operation.

SUMMARY OF THE INVENTION

A controlling method which is capable of keeping a target object from coming into contact with a printing unit.

A printing apparatus according to the present invention includes: a printing unit configured to perform printing on a first target object and a second target object by ejecting a liquid in a first direction; a first placement unit on which the first target object is placeable; a second placement unit on which the second target object is placeable; a first adjustment unit configured to adjust a first distance in the first direction between the first target object placed on the first placement unit and the printing unit; a second adjustment unit configured to adjust a second distance in the first direction between the second target object placed on the second placement unit and the printing unit; and a control unit configured to control at least one of the first adjustment unit and the second adjustment unit such that the first distance is smaller than the second distance in a case of printing on the first target object.

According to the present invention, it is possible to provide a printing apparatus and a controlling method, which are capable of keeping a target object from coming into contact with a printing unit.

Further features of the present invention will become apparent from the following description of exemplary embodiments with reference to the attached drawings.

DESCRIPTION OF THE EMBODIMENTS

First Embodiment

A first embodiment of the present invention will be described below with reference to the drawings.

Figure 1:
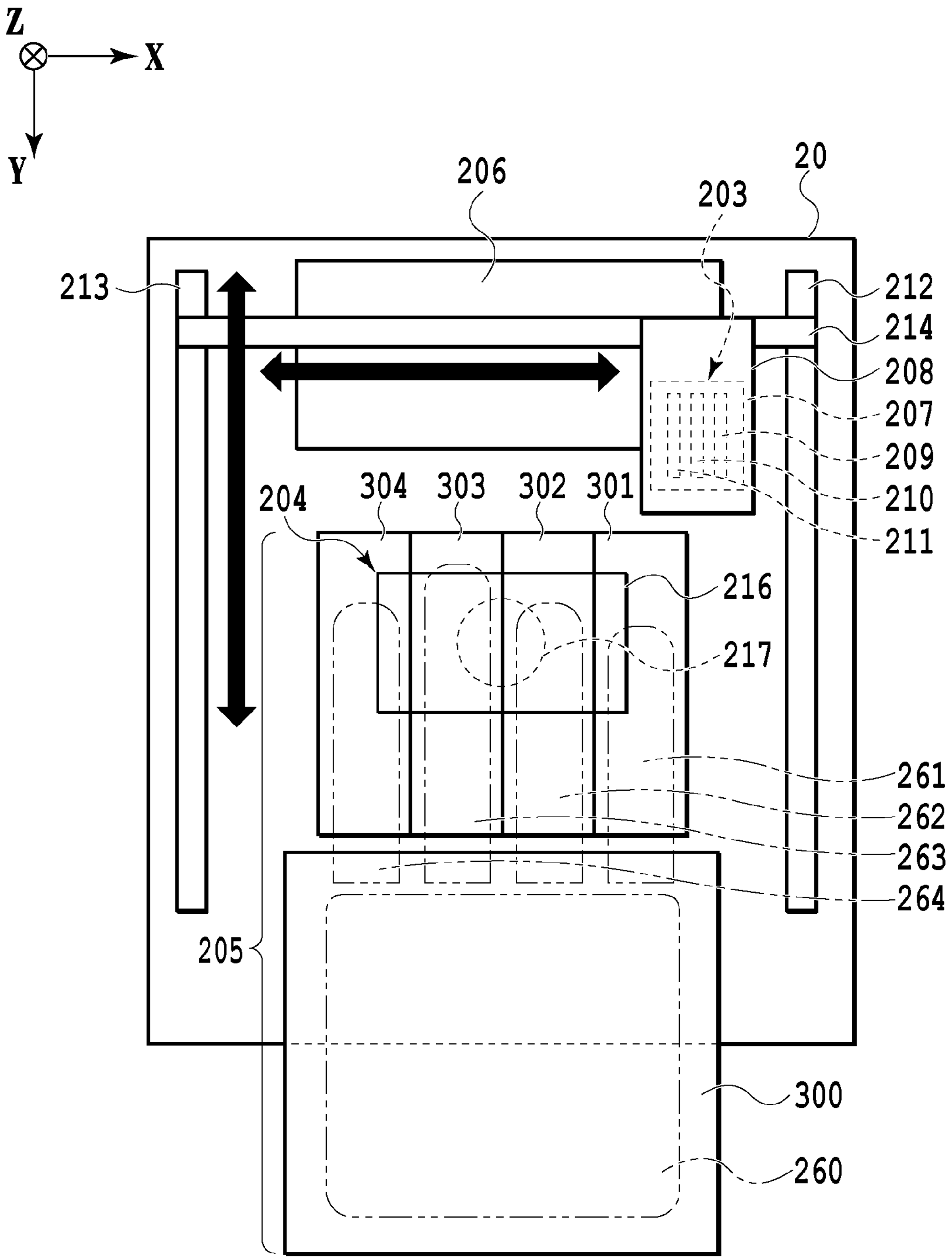
FIG. 1 is a top plan view showing a nail printing apparatus.

FIG. 1 is a top plan view showing a nail printing apparatus (hereinafter also simply referred to as a printing apparatus)

Figure 2:
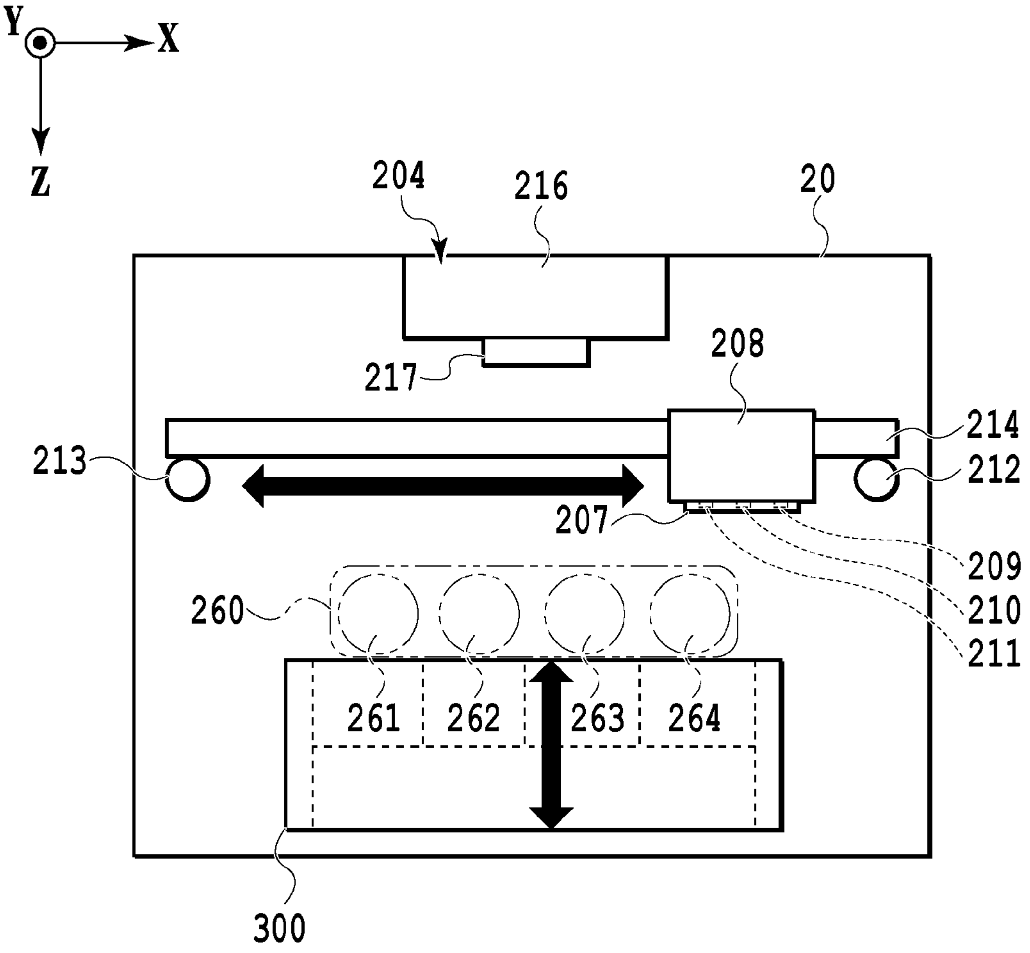
FIG. 2 is a front view of the nail printing apparatus.
Figure 3:
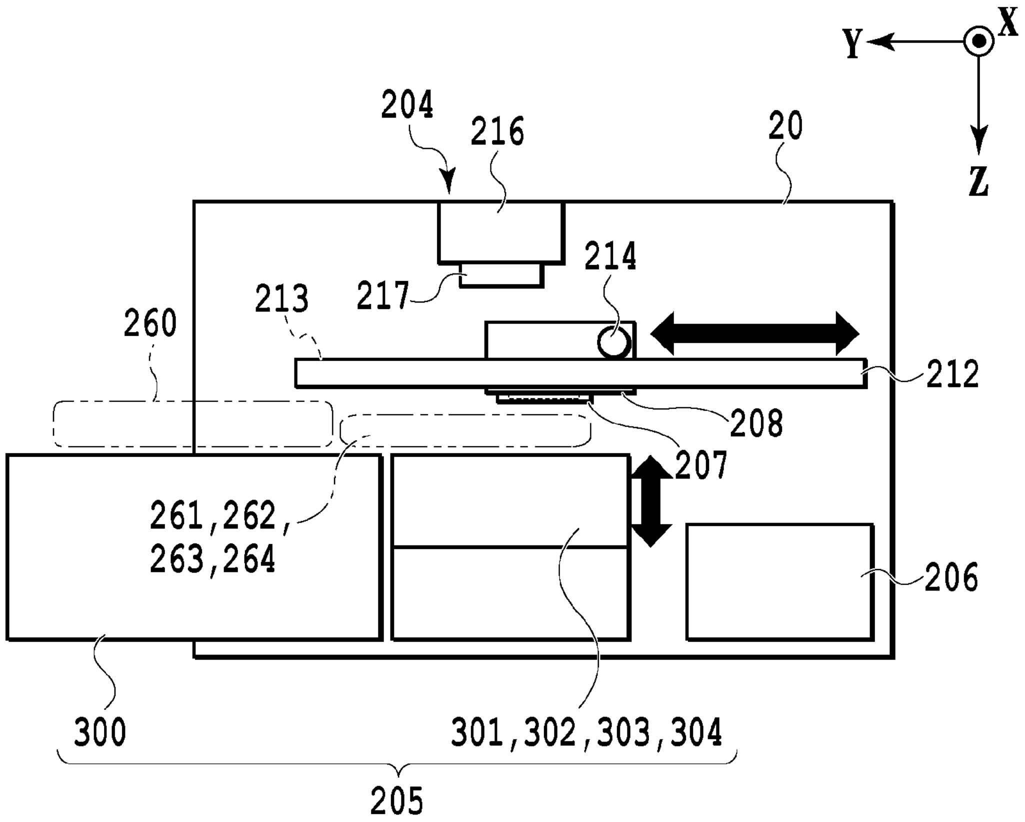
FIG. 3 is a right side view of the nail printing apparatus.

20 according to the present embodiment. FIG. 2 is a front view of the printing apparatus 20, and FIG. 3 is a right side view of the printing apparatus 20.

The printing apparatus 20 is a printing apparatus that prints an image on a nail being a print medium in accordance with an ink jet printing method. The printing apparatus 20 includes a printing unit 203 that performs printing on nails, a hand placement unit 205 for placing a hand and fingers on for printing, and a shooting unit 204 for recognizing positions in a direction of an arrow x and a direction of an arrow y of each nail. In the present embodiment, the direction of the arrow x is orthogonal to the direction of the arrow y. Meanwhile, in each of the drawings, a direction of an arrow z represents a direction of gravitational force. The printing apparatus 20 further includes a control unit 206 that controls overall operations of the printing apparatus 20. In the meantime, the following embodiment will describe the printing apparatus that performs printing on nails of a user as target objects. However, the target objects are not limited to particular objects and may be objects other than the nails.

<Printing Unit>

The printing unit 203 includes a print head 207 that ejects liquids (hereinafter also referred to as inks) in the course of printing, and a carriage 208 configured to mount the print head 207 and to be movable in the direction of the arrow x. The print head 207 is configured to eject the inks based on the principle of ejection according to the ink jet mode. In the present embodiment, the print head 207 ejects the inks in the direction of the arrow z as a direction of ejection. The print head 207 includes a cyan ink ejection nozzle 209 configured to eject cyan ink, a magenta ink ejection nozzle 210 configured to eject magenta ink, and a yellow ink ejection nozzle 211 configured to eject yellow ink. The printing apparatus 20 is provided with rail guides 212 and 213 that extend in the direction of the arrow y for moving the carriage 208 in the direction of the arrow y, and a rail guide 214 that extends in the direction of the arrow x for moving the carriage 208 in the direction of the arrow x. The carriage 208 and the print head 207 mounted on the carriage 208 can move in the directions of the arrows x and y along the rail guides 212, 213, and 214 by using two not-illustrated motors. Note that the colors of the inks to be ejected from the print head 207 are mere examples and are not limited to the aforementioned colors.

The printing apparatus 20 repeatedly executes an ejecting operation to eject the inks onto the nail based on print data while moving the print head 207 mounted on the carriage 208 in the direction of the arrow x, and a moving operation to move the print head 207 in the direction of the arrow y. Thus, the printing apparatus 20 completes printing on the nail.

<Shooting Unit>

The shooting unit 204 includes a camera 216 which is disposed at a position opposed to the nails of the fingers placed on finger placement units 301, 302, 303, and 304 at the time of printing and on an inner side of a ceiling of the printing apparatus 20 so as to be capable of shooting the nails. A shooting lens 217 is disposed below the camera 216. The shooting unit 204 may be installed at the printing apparatus 20, or may be realized by causing a user to attach an instrument such as a smartphone equipped with a camera function to the printing apparatus 20, for example. Rough positions on xy plane of the nails being the print media can be specified by shooting the nails with the shooting unit 204 in a state where the hand is placed on the hand placement unit 205.

<Control Unit>

Figure 4:
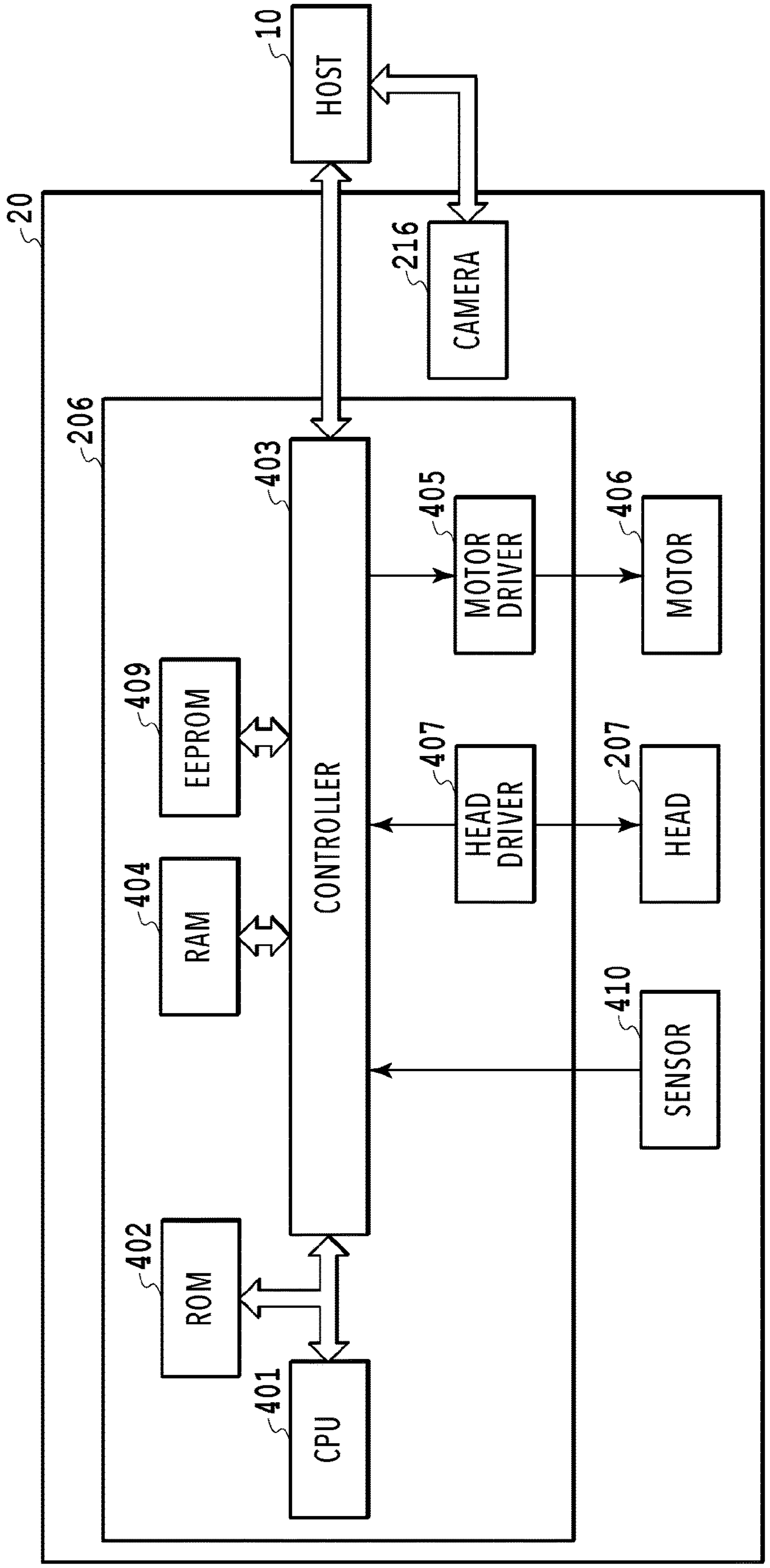
FIG. 4 is a block diagram showing a schematic configuration of the printing apparatus.

FIG. 4 is a block diagram showing a schematic configuration of the printing apparatus 20. As shown in FIG. 4, the printing apparatus 20 includes the control unit 206, the print head 207, the camera 216, a motor 406, and a sensor 410. In the meantime, the printing apparatus 20 is configured to be communicable with a host 10 such as a computer, a smartphone, and a tablet terminal.

The control unit 206 includes a CPU 401, a ROM 402, a controller 403, a RAM 404, a motor driver 405, a print head driver 407, and an EEPROM 409.

The CPU (central processing unit) 401 controls respective mechanisms in the printing apparatus 20 through the controller 403 in accordance with various programs stored in the ROM 402. The ROM 402 stores the various programs. The RAM 404 is used as a work area in the case of temporarily saving various data and executing processing. The CPU 401 carries out image processing in order to convert image data received from the host 10 into a print signal that is printable with the printing apparatus 20. Moreover, the CPU 401 drives the motor 406 through the motor driver 405 based on information subjected to the image processing and the like, and drives the print head 207 through the print head driver 407, thereby printing an image on a print medium. Note that in FIG. 4, various motors in the printing apparatus 20 are indicated as the motor 406 while the motor drivers for driving the motors are indicated as the motor driver 405.

Meanwhile, the control unit 206 includes the electrically writable EEPROM 409. The EEPROM 409 stores various setting values or data to be updated. The data stored in the EEPROM 409 are used as control parameters by the controller 403 or by the CPU 401. Note that various sensors such as an encoder sensor provided to the printing apparatus 20 are indicated as the sensor 410 in FIG. 4. The CPU 401 increments values in a ring buffer in the RAM 404 as appropriate while using count information obtained by the encoder sensor that counts slits. The CPU 401 performs a variety of control based on the information obtained with the sensor 410.

The camera 216 is connected to the host 10. The host 10 carries out image processing concerning positional information on the nails based on the image information obtained with the camera 216. The CPU 401 carries out a variety of control based on the positional information on the nails obtained from the host 10.

Note that FIG. 4 shows a schematic configuration and a different configuration may be included therein. Moreover, FIG. 4 shows an example in which the printing apparatus 20 and the host 10 are separate devices. Instead, the host 10 may be incorporated in the printing apparatus 20.

<Hand Placement Unit>

Figure 5:
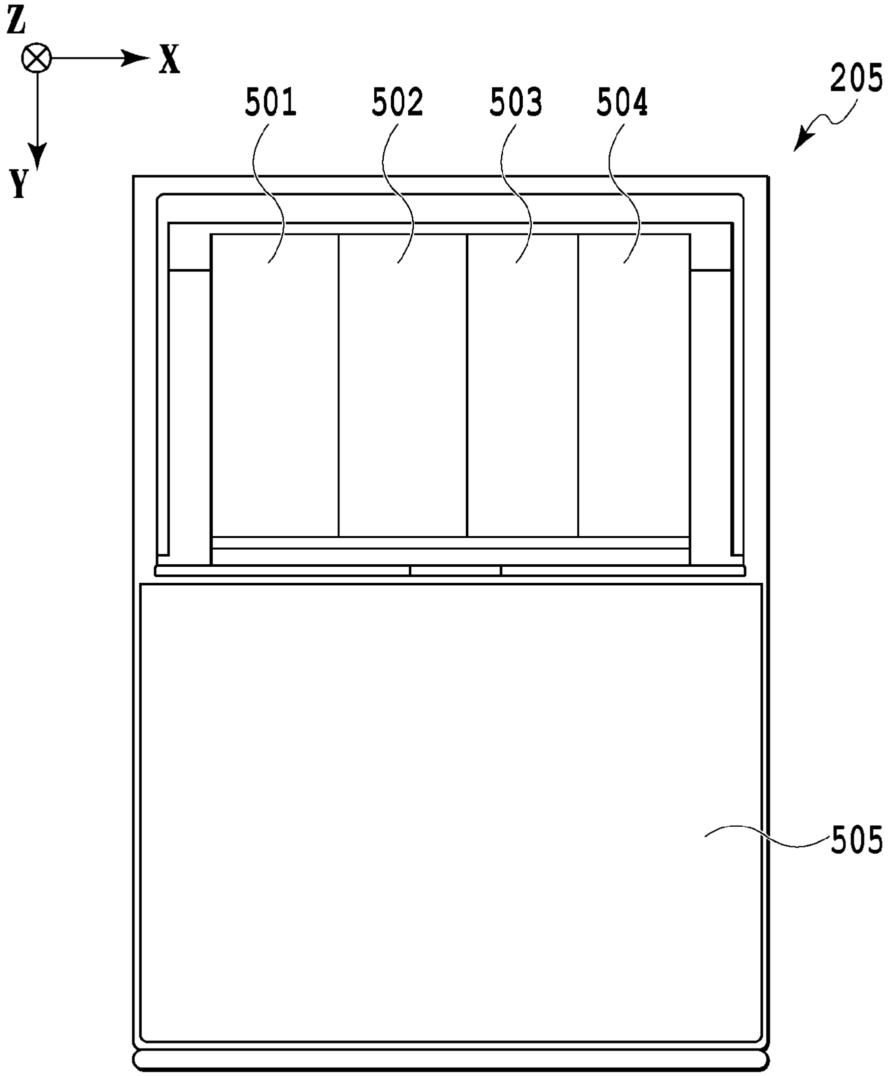
FIG. 5 is a top plan view showing a hand placement unit of the printing apparatus.
Figure 6:
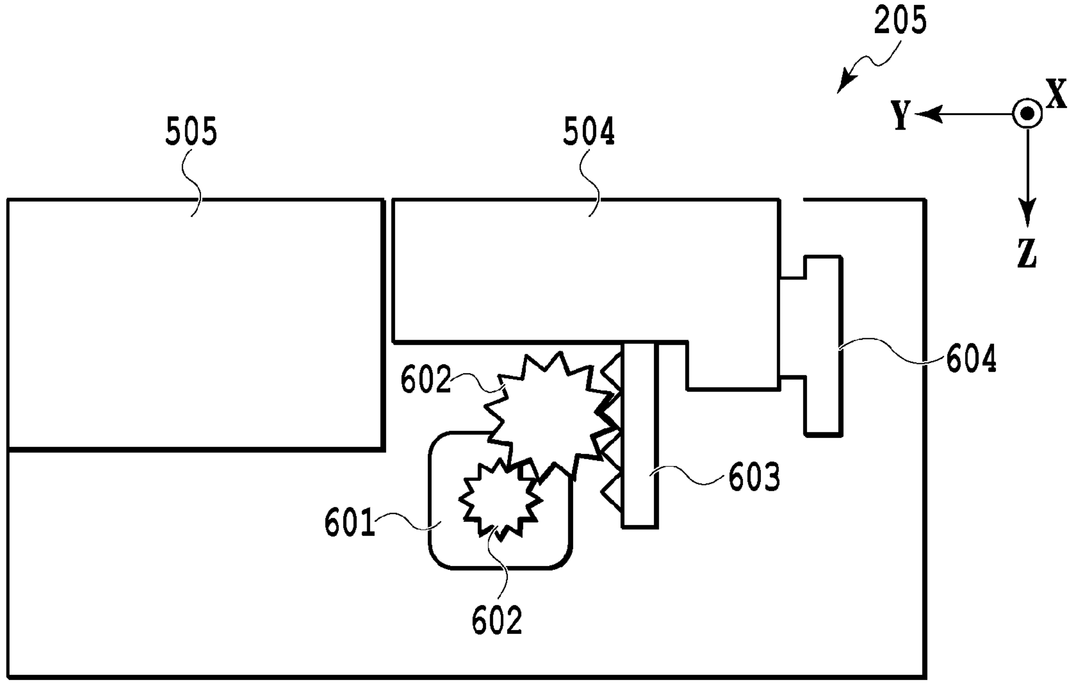
FIG. 6 is a side sectional view of the hand placement unit.

FIG. 5 is a top plan view showing the hand placement unit 205 of the printing apparatus 20, and FIG. 6 is a side sectional view of the hand placement unit 205. The hand placement unit 205 includes finger placement units 501, 502, 503, and 504 where the fingers can be placed on. In the case of placing the right hand on the hand placement unit 205, the index finger is placed on the finger placement unit 501, the middle finger is placed on the finger placement unit 502, the ring finger is placed on the finger placement unit 503, and the little finger is placed on the finger placement unit 504. Moreover, the hand placement unit 205 includes a palm placement unit 505 to place the palm of the hand provided with the nails to be printed. The finger placement units 501, 502, 503, and 504 are arranged at positions that can be opposed to the print head 207, and the print head 207 prints on the nails of the fingers placed on the finger placement units 501, 502, 503, and 504 by ejecting the inks while scanning the nails.

Generally, in the case of printing on the nails by using the print head, the nails need to be brought close to the print head. However, since the distance between each nail and the print head is close, the fingers or the nails may hit the print head that performs scanning if the user moves the fingers during the printing. In the case where two or more nails are being printed in such a way as to print on each of the nails one by one, the fingers other than the finger with the nail being printed need to stand by. Especially in the case of printing on these nails, a printing period becomes longer as the number of the nails to be printed is larger. Hence, the user is prone to move the fingers that are standing by, and the nails or the fingers may often hit the print head as a consequence.

Given the circumstances, the finger placement units 501, 502, 503, and 504 provided to the printing apparatus 20 of the present embodiment include height adjustment mechanisms, respectively, which can individually adjust heights of the fingers (the nails) placed thereon. Such individual adjustment of the heights of the fingers (the nails) makes it possible to adjust the distances between the print head 207 and the respective nails, thus keeping the fingers or the nails from hitting the print head 207. The finger placement units 501, 502, 503, and 504 are preferably formed from independent components. Since the height adjustment mechanisms of the finger placement units 501, 502, 503, and 504 are the same, the following description will be given of the finger placement unit 504 as an example.

The finger placement unit 504 is moved by using a motor 601 as a drive source. The height of the finger placement unit 504 attached to a rack gear 603 is adjusted by rotating gears 602 along with rotation of the motor 601. The finger placement unit 504 is provided with a guide (a linear guide in this case) 604, whereby movement in the direction of the arrow z (the direction of gravitational force) of the finger placement unit 504 is restricted. Here, the motor 601 may be independently provided to each of the fingers, or may be used by the fingers in common. In the case of using the common motor, it is necessary to provide a structure to change a destination of transmission of power of the motor by using a switch or the like in order to move a desired one of the finger placement units. In the meantime, the position of the nail subjected to printing is adjusted to a higher position than the nails not subjected to printing. Specifically, only the nail subjected to printing is located at a high position while the nails not subjected to printing are located at low positions. In this way, it is possible to keep the nails not subjected to printing from coming into contact with the print head 207 during the printing.

As described above, the mechanisms that can individually raise and lower the finger placement units 501, 502, 503, and 504 make it possible to optimally adjust the distance between each nail and the print head 207 regardless of different shapes and sizes among the nails.

Figure 7A:
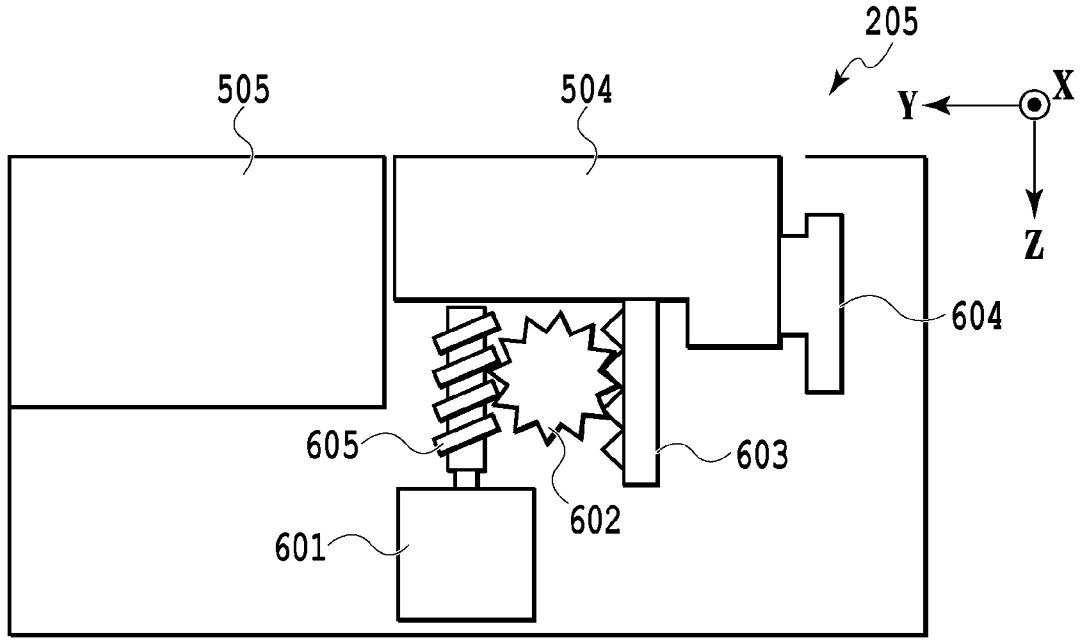
FIG. 7A is a side sectional view of the hand placement unit adopting a worm gear.
Figure 7B:
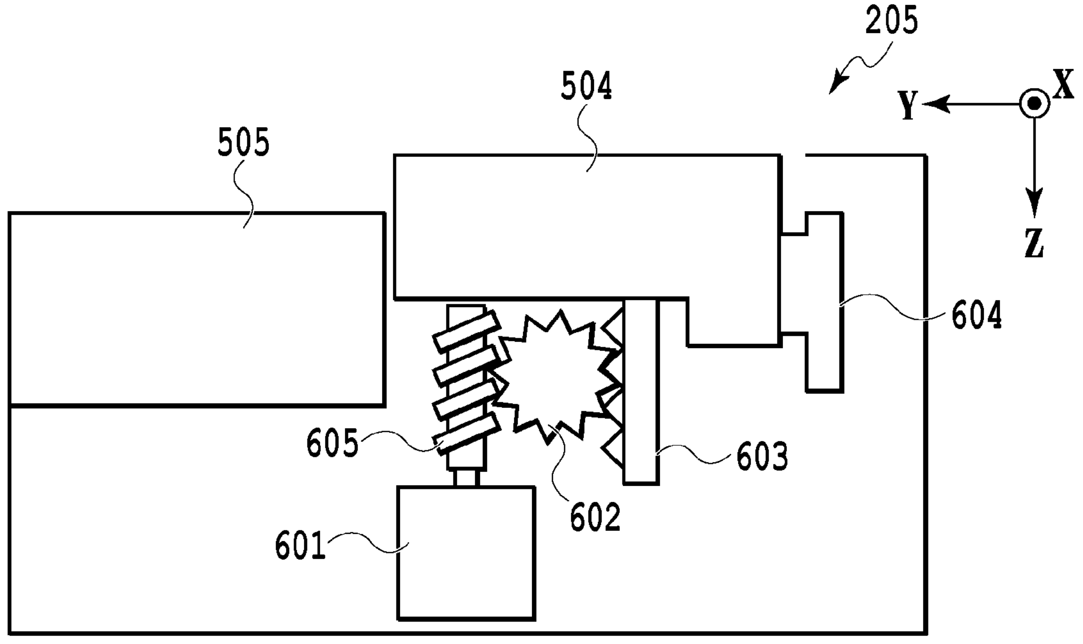
FIG. 7B is another side sectional view of the hand placement unit adopting the worm gear.

FIGS. 7A and 7B are side sectional views of the hand placement unit 205 adopting a worm gear 605 instead of the gears to be rotated by the motor 601 in the configuration shown in FIG. 6. As shown in FIG. 7A, the use of the worm gear 605 makes it possible to maintain the finger placement unit 504 at a raised position without lowering the finger placement unit 504 even in a case of putting a load of the finger on the finger placement unit 504 after raising the finger placement unit 504.

In FIG. 7B, the finger placement unit 504 is located at a position higher than the palm placement unit 505 as compared to the configuration in FIG. 7A. The finger placement unit 504 is preferably located at a position higher by at least 5 mm than the palm placement unit 505. By setting the position of the finger placement unit 504 higher than the position of the palm placement unit 505 as described above, each finger is located at a position higher than the palm and the movement of each finger in the direction of the arrow z is restricted. Thus, it is possible to further reduce the chance of the nails coming into contact with the print head 207 during the printing.

Figure 8A:
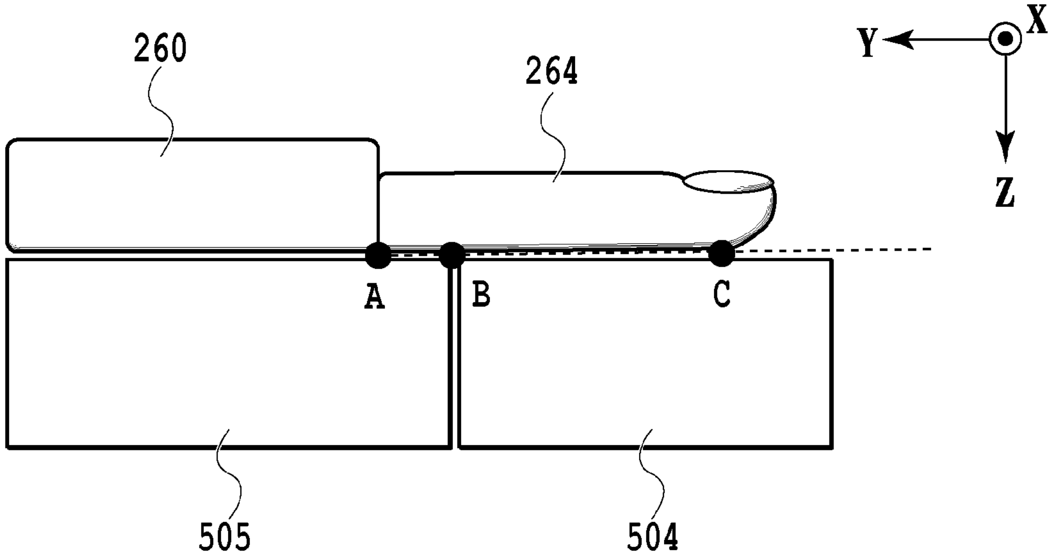
FIG. 8A is a schematic diagram of the hand placement unit with a hand placed thereon.
Figure 8B:
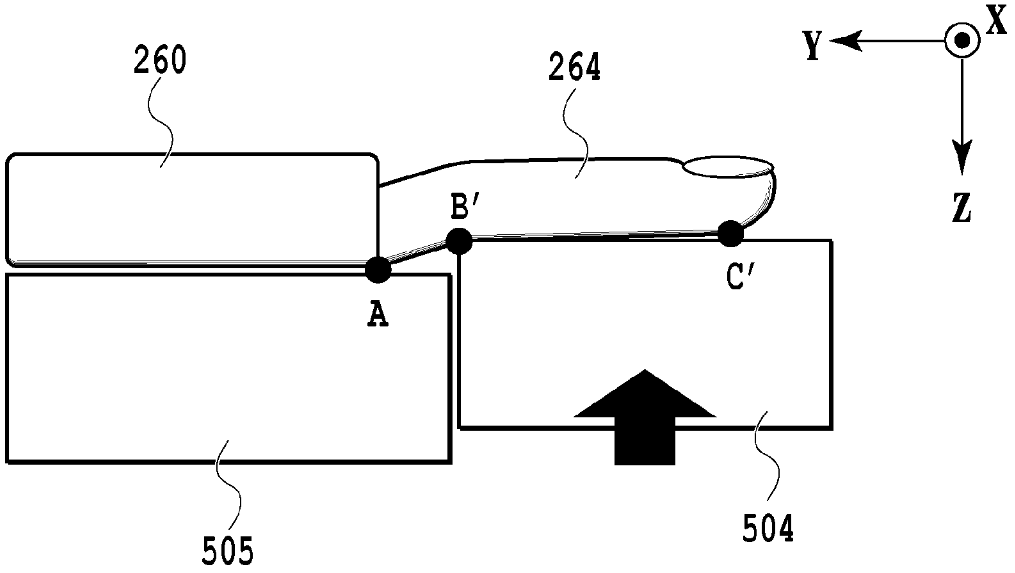
FIG. 8B is another schematic diagram of the hand placement unit with the hand placed thereon.

FIGS. 8A and 8B are schematic diagrams of the hand placement unit 205 with the hand placed thereon. After the hand is placed on the hand placement unit 205 as shown in FIG. 8A, the finger placement unit 504 on which the finger with the nail being the print target placed is raised so as to lift the relevant finger.

Here, a point at a base of a finger 264 is defined as a point A, a point of the finger 264 on a boundary between the finger placement unit 504 and the palm placement unit 505 is defined as a point B, and a point at a tip (an upstream end in the direction of the arrow y) of the finger 264 in contact with the finger placement unit 504 is defined as a point C as shown in FIG. 8A. Then, the finger placement unit 504 is raised as shown in FIG. 8B.

In this case, the point B is shifted to a point B', and the point C is raised to a point C' without changing the position of the tip of the finger 264 in contact with the finger placement unit 504. Here, a line segment AB' is longer than a line segment AB. Accordingly, a line segment AC' which is a sum of the line segment AB' and a line segment B'C' becomes longer than a line segment AC before raising the finger placement unit 504. In other words, as a consequence of raising the finger placement unit 504, the finger 264 placed on the finger placement unit 504 is pulled in the direction of the arrow y.

In the finger placement units as described above, the finger placement unit on which the finger with the nail to be printed is placed is set higher than the finger placement units on which the fingers with the nails not to be printed are placed. Regarding the height in this case, the nail to be printed is preferably located at the position higher by 1 mm or preferably by 5 mm than the nails not to be printed. In the case of printing, the palm is placed on the palm placement unit 505 and the fingers are placed on the finger placement units 501, 502, 503, and 504. Then, the finger placement unit (such as the finger placement unit 504) on which the finger with the nail to be printed is placed is raised so as to pull the finger placed thereon. As a consequence, the finger which is not placed in a state of being stretched before raising the finger placement unit is stretched straight after raising the finger placement unit. Then, the movement of the finger in the direction of the arrow z is suppressed and a height of a portion above the first joint of the finger is reduced. Thus, it is possible to keep the finger from coming into contact with the print head 207.

Figure 9:
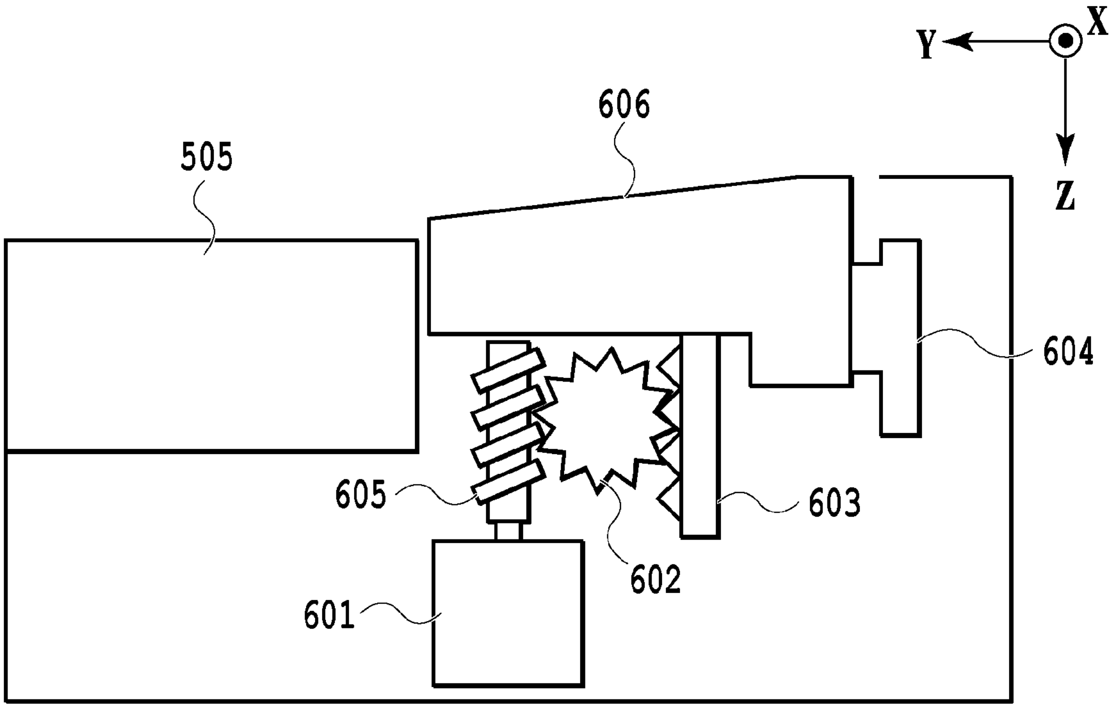
FIG. 9 is a diagram showing a modified example of a finger placement unit.

FIG. 9 is a diagram showing a modified example of the finger placement unit. A finger placement unit 606 includes an inclined surface formed by inclining a portion to place the finger, and the inclined surface is formed to become gradually higher toward the tip (upstream in the direction of the arrow y). In other words, the inclined surface of the finger placement unit 606 is inclined such that the position of the tip of the finger becomes higher than the position of the base of the finger in the case where the finger is placed thereon. An angle of the inclined surface is preferably an angle larger than 0 degrees and smaller than 30 degrees, or more preferably an angle larger than 0 degrees and smaller than 20 degrees, or even more preferably an angle larger than 2 degrees and smaller than 20 degrees. In general, the finger becomes thinner toward the tip. Accordingly, a surface of the nail to be printed can be brought close to the horizontal plane by inclining the portion to place the finger on as in the case of the finger placement unit 606. Moreover, since the nail constitutes the uppermost part of the finger in this case, the portion other than the nail is less likely to come into contact with the print head 207.

Figure 10A:
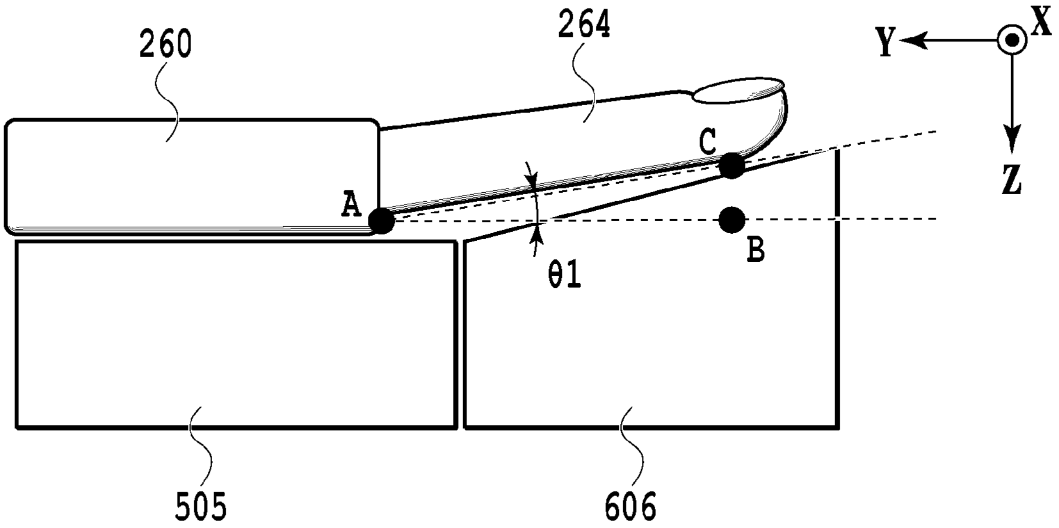
FIG. 10A is a schematic diagram showing the hand placement unit provided with a finger placement unit.
Figure 10B:
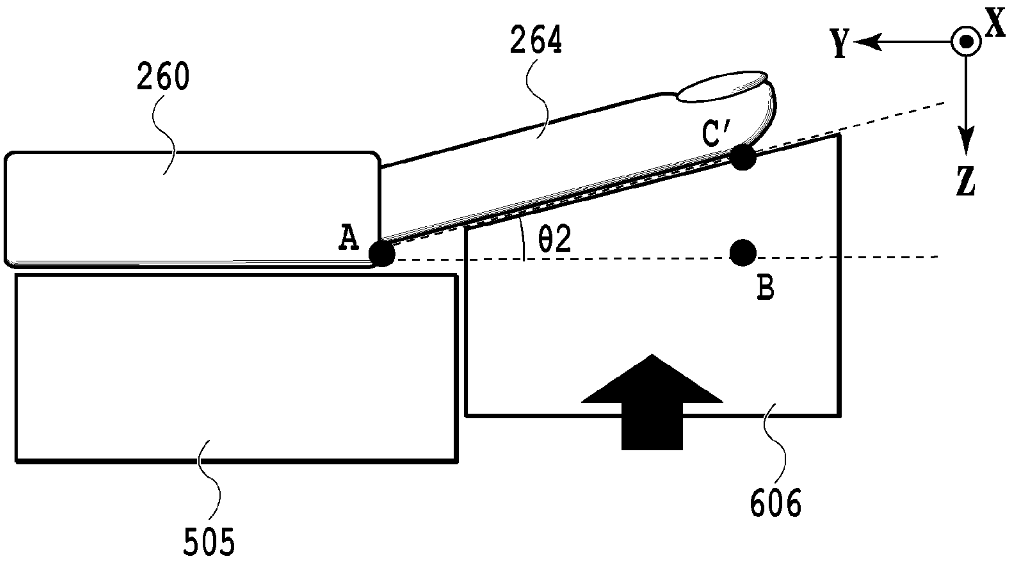
FIG. 10B is another schematic diagram showing the hand placement unit provided with the finger placement unit.

FIGS. 10A and 10B are schematic diagrams showing the hand placement unit 205 provided with the finger placement unit 606. As shown in FIG. 10A, after the hand is placed on the hand placement unit 205, the finger placement unit 606 on which the finger with the nail to be printed is placed is raised so as to lift the relevant finger.

Here, a point at the base of the finger 264 is defined as a point A, and a point at the tip of the finger 264 in contact with the finger placement unit 606 is defined as a point C as shown in FIG. 10A. Meanwhile, a point where a line extending in the −y direction from the point A at the base of the finger 264 intersects with a line extending downward from the point C in the direction of the arrow z is defined as a point B. Moreover, an angle ∠CAB is defined as θ1. Then, the finger placement unit 606 is raised as shown in FIG. 10B.

In this case, the point C is shifted to a point C', and an angle ∠C'AB becomes θ2 (θ1<θ2). Here, the line segment AC is expressed as AC=AB/cos θ1 and the line segment AC' is expressed as AC'=AB/cos θ2. Since θ2>θ1 holds true, the line segment AC' is longer than the line segment AC. In other words, as a consequence of raising the finger placement unit 606, the finger 264 placed on the finger placement unit 606 is pulled.

Figure 11:
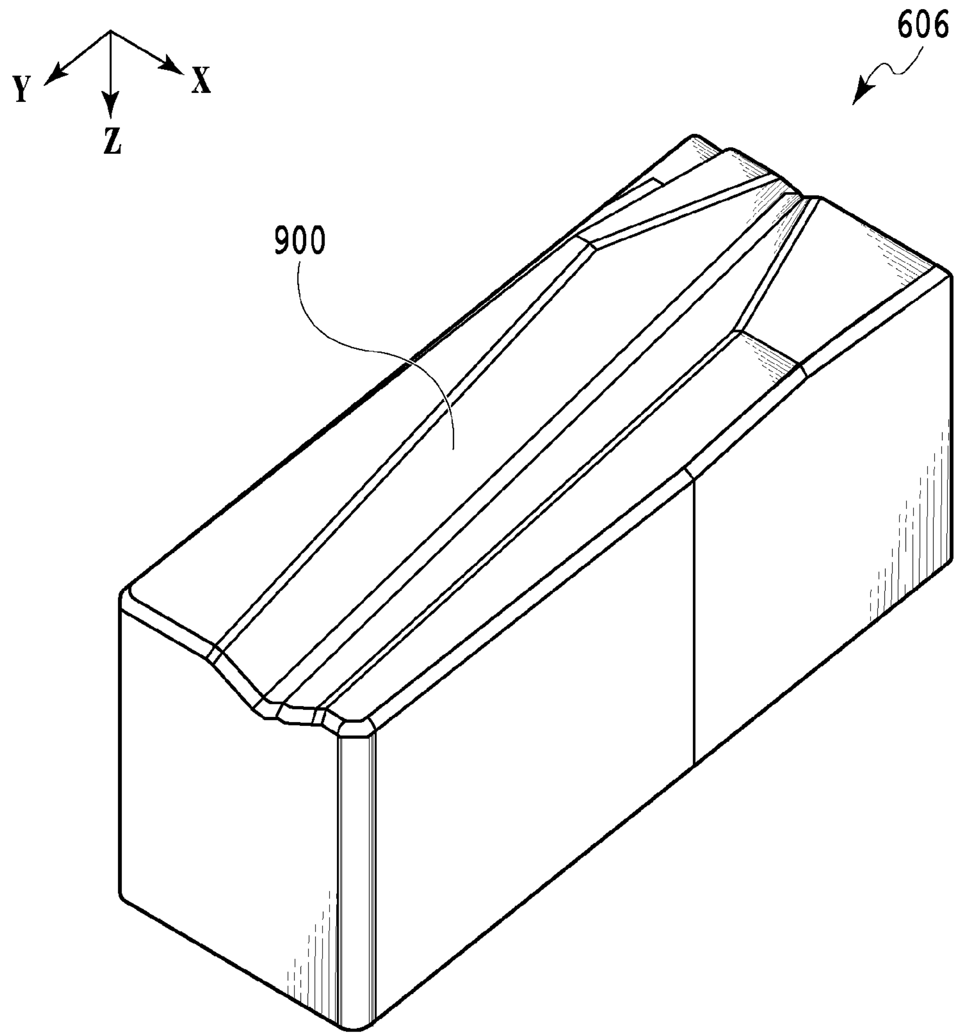
FIG. 11 is a diagram showing an example of the finger placement unit.

FIG. 11 is a diagram showing an example of the finger placement unit 606. As shown in FIG. 11, the surface of the finger placement unit 606 to place the finger on is preferably provided with a groove 900 that restricts movement of the placed finger in the direction of the arrow x. To be more precise, a groove having a U-shaped cross-section or a groove having a V-shaped cross-section extending in a place direction of the finger may be formed at the position to place the finger on. By forming the groove as described above, the movement of the finger in the direction of the arrow x is restricted so that the printing on the nail can be stably conducted. Here, the shape of the groove is preferably of the V-shaped cross-section in particular. By forming the groove into the shape having the V-shaped cross-section, the groove can deal with multiple fingers having different thicknesses.

Although the description has been given above of the example in which the surface of the finger placement unit 606 to place the finger on is provided with the groove 900, the surface of the finger placement unit 504 (see FIG. 6) to place the finger on may be provided with such a groove instead.

Figure 12:
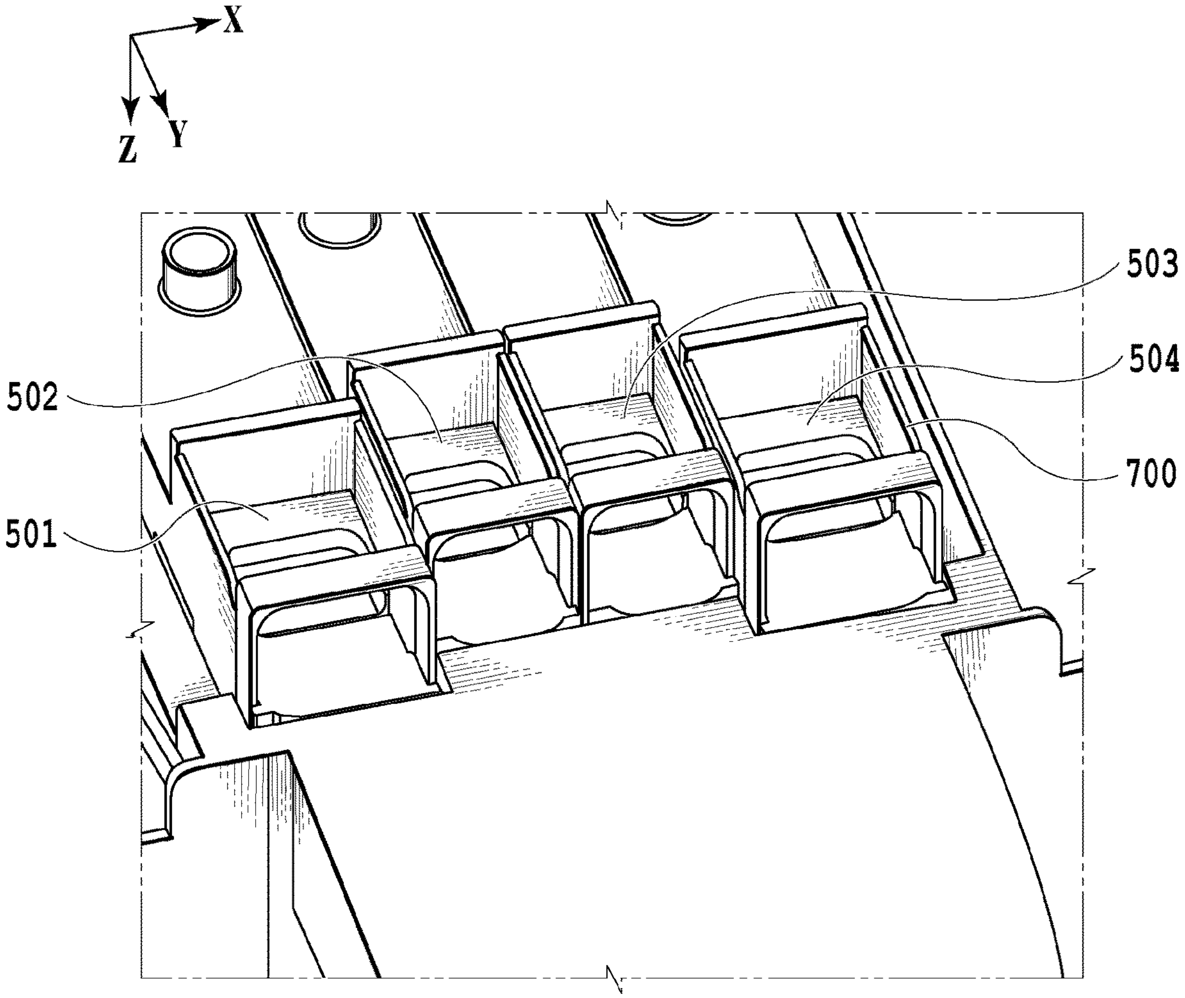
FIG. 12 is a diagram showing projections provided to the finger placement unit.

FIG. 12 is a diagram showing projections 700 provided to the finger placement unit. The projections 700 for protecting the finger are preferably provided to two side ends of an upper surface of the finger placement unit 504. Provision of the projections 700 allows the finger to be placed at the center of a placement surface of the finger placement unit 504, so that the finger is kept from being caught by a gap between the finger placement units in a case where the finger placement units are raised and lowered individually. In addition, it is possible to maintain the placed finger at a stable position and the projections 700 serve as a guide in a case where the user sets each finger on the finger placement unit, thereby allowing the user to place the fingers at the right positions.

Figure 13A:
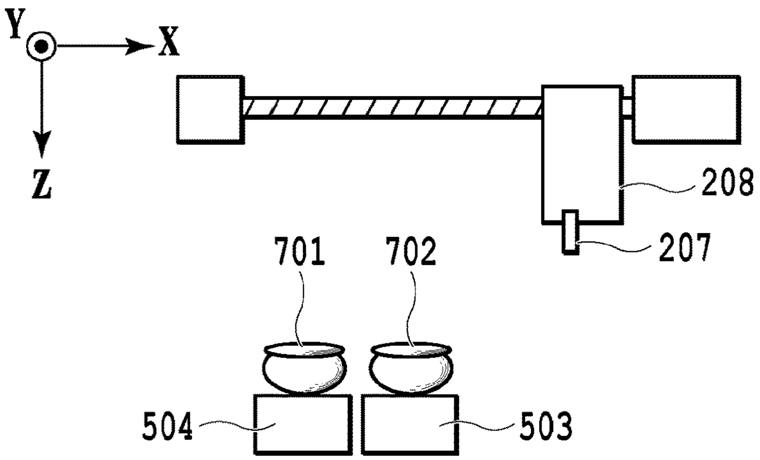
FIG. 13A is a diagram showing a printing operation on a nail.
Figure 13B:
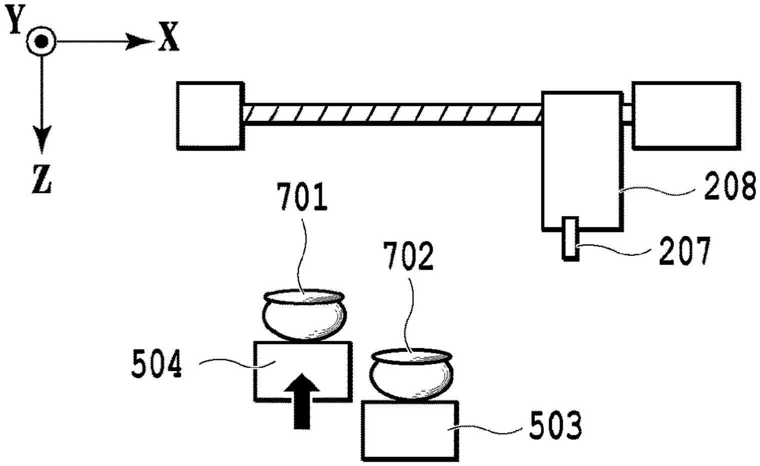
FIG. 13B is another diagram showing the printing operation on the nail.
Figure 13C:
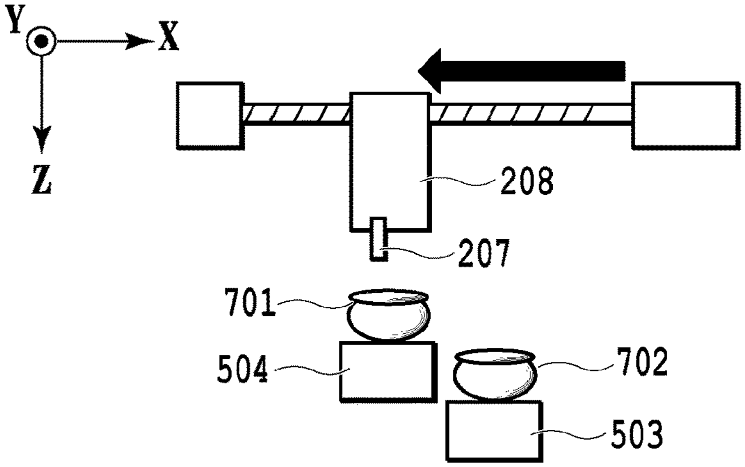
FIG. 13C is another diagram showing the printing operation on the nail.

FIGS. 13A to 13C are diagrams showing a printing operation on the nail in accordance with a process sequence. FIGS. 13A to 13C will explain an example of sequentially printing on the nails on two fingers adjacent to each other. However, the present invention is not limited only to this configuration and any two or more fingers may be subjected to the printing.

The printing apparatus 20 adjusts the heights of the finger placement units such that a maximum height of a first nail 701 in the course of printing on the first nail 701 is higher than a maximum height of a second nail 702 that stands by for the printing. Meanwhile, the printing apparatus 20 adjusts the heights of the finger placement units such that the maximum height of the second nail 702 in the course of printing on the second nail 702 is higher than the maximum height of the first nail 701 that stands by after completion of the printing.

In FIG. 13A, both the first nail 701 and the second nail 702 are located at standby positions. In the case where the printing is started, the finger placement unit 504 is raised from the state in FIG. 13A to the state in FIG. 13B and the first nail 701 moves from the standby position to a printing position. The second nail 702 maintains the state at the standby position. In the case where the movement of the first nail 701 to the printing position is completed, the first nail 701 is subjected to the printing by scanning with the print head 207 as shown in FIG. 13C. In the case where the printing on the first nail 701 is completed, the finger placement unit 504 is lowered and the first nail 701 moves from the printing position to the standby position. Thereafter, the finger placement unit 503 is raised and the second nail 702 moves from the standby position to the printing position. In the case where the movement of the second nail 702 to the printing position is completed, the second nail 702 is subjected to the printing by scanning with the print head 207.

Figure 14A:
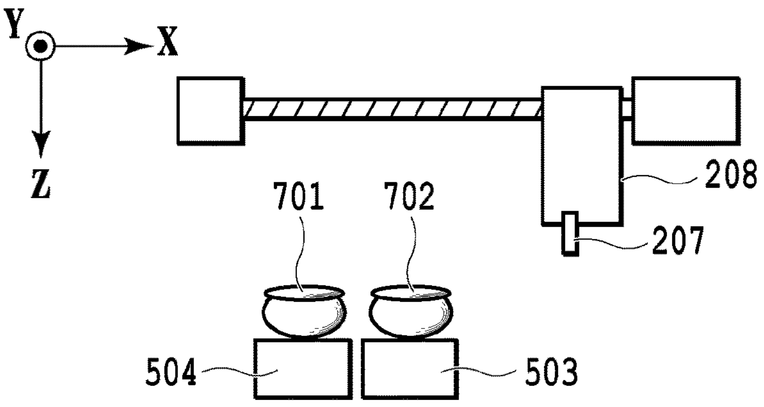
FIG. 14A is a diagram showing a printing operation in accordance with a process sequence.
Figure 14B:
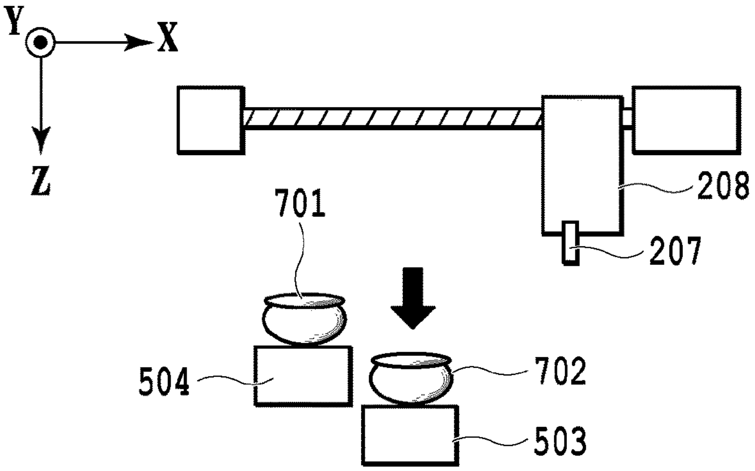
FIG. 14B is another diagram showing the printing operation in accordance with the process sequence.
Figure 14C:
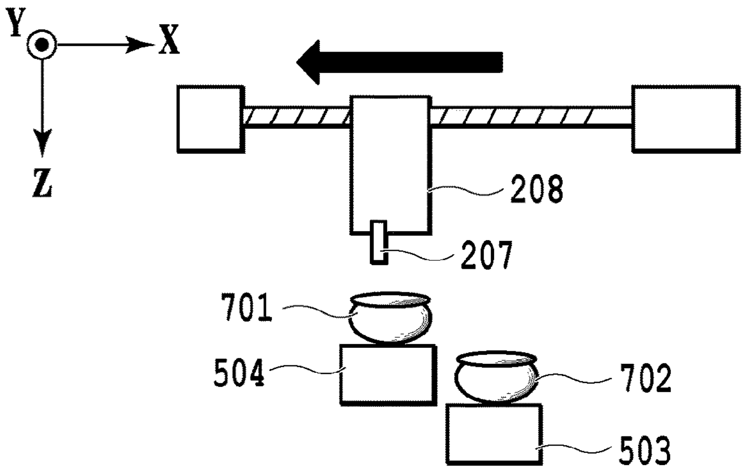
FIG. 14C is another diagram showing the printing operation in accordance with the process sequence.

FIGS. 14A to 14C are diagrams showing a printing operation of a different example, which is different from the printing operation described with reference to FIGS. 13A to 13C. FIGS. 14A to 14C will also explain an example of sequentially printing on the nails on two fingers adjacent to each other as with FIGS. 13A to 13C. However, the present invention is not limited only to this configuration and any two or more fingers may be sequentially subjected to the printing.

In FIG. 14A, both the first nail 701 and the second nail 702 are located at the printing positions. In the case where the printing is started, the finger placement unit 503 is lowered from the state in FIG. 14A to the state shown in FIG. 14B and the second nail 702 moves from the printing position to the standby position. The first nail 701 maintains the state at the printing position. In the case where the movement of the second nail 702 to the standby position is completed, the first nail 701 is subjected to the printing by scanning with the print head 207 as shown in FIG. 14C. In the case where the printing on the first nail 701 is completed, the finger placement unit 504 is lowered and the first nail 701 moves from the printing position to the standby position. Thereafter, the finger placement unit 503 is raised and the second nail 702 moves from the standby position to the printing position. In the case where the movement of the second nail 702 to the printing position is completed, the printing on the second nail 702 is started by scanning with the print head 207.

Here, the nails to be printed may be coated with a foundation layer in advance so as to improve print quality. It is possible to improve the print quality by coating a white foundation on the nails in advance, for example. Meanwhile, it is possible to improve durability of a printed image by applying an ink fixation layer in advance.

As described above, in the course of printing on the first nail 701, the distance between the first nail 701 and the print head 207 in the case where the first nail 701 is opposed to the print head 207 is made shorter than the distance between the second nail 702 and the print head 207 in the case where the second nail 702 is opposed to the print head 207. Thus, it is possible to provide the printing apparatus and the controlling method therefor, which are capable of keeping the nail from coming into contact with the printing unit.

Second Embodiment

A second embodiment of the present invention will be described below with reference to the drawings. Since basic configurations of the present embodiment are the same as those of the first embodiment, the following description will be focused on characteristic configurations of the present embodiment. The present embodiment will describe a printing method that reduces time required for the printing by moving two or more fingers in parallel.

FIGS. 15A to 15H are diagrams showing a printing operation on a nail of the present embodiment in accordance with a process sequence. FIGS. 15A to 15H will explain an example of sequentially printing on the nails of the two fingers, namely, the first nail 701 and the second nail 702. However, the present invention is not limited only to this configuration and any two or more fingers may be subjected to the printing.

Figure 15A:
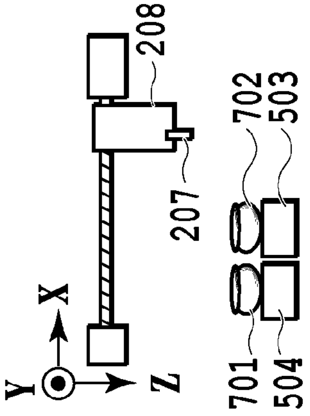
FIG. 15A is a diagram showing a printing operation on a nail according to an embodiment of the present invention.
Figure 15B:
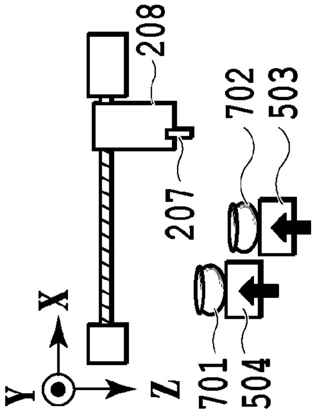
FIG. 15B is another diagram showing the printing operation on the nail according to the embodiment.
Figure 15C:
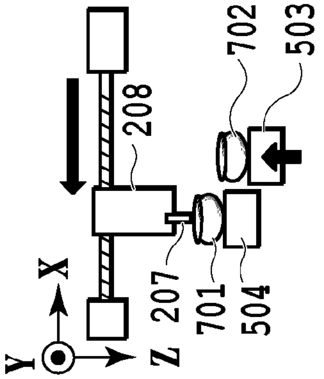
FIG. 15C is another diagram showing the printing operation on the nail according to the embodiment.
Figure 15D:
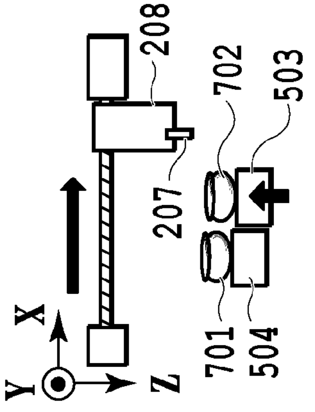
FIG. 15D is another diagram showing the printing operation on the nail according to the embodiment.
Figure 15E:
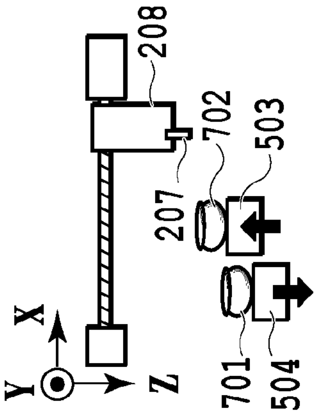
FIG. 15E is another diagram showing the printing operation on the nail according to the embodiment.
Figure 15F:
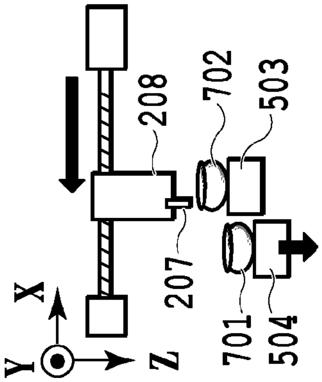
FIG. 15F is another diagram showing the printing operation on the nail according to the embodiment.
Figure 15G:
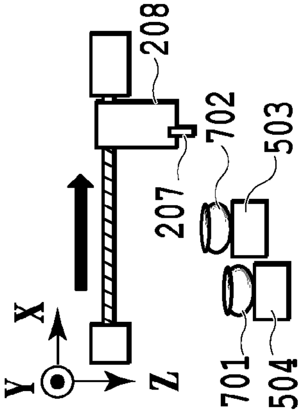
FIG. 15G is another diagram showing the printing operation on the nail according to the embodiment.
Figure 15H:
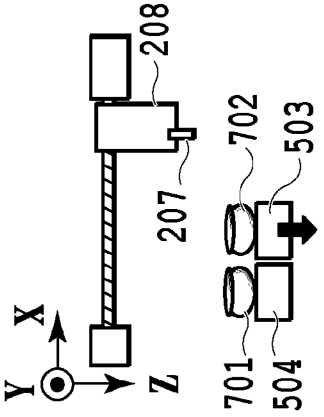
FIG. 15H is another diagram showing the printing operation on the nail according to the embodiment.

In the present embodiment, the movement of the finger placement unit 503 on which the finger with the second nail 702 is placed is started in the course of adjusting the distance between the first nail 701 and the print head 207 by moving the finger placement unit 504. In the printing operation of the present embodiment, both the first nail 701 and the second nail 702 are located at standby positions in the first place as shown in FIG. 15A. In the case where the printing is started, the finger placement unit 504 is firstly started to rise from the state in FIG. 15A to the state in FIG. 15B and the first nail 701 starts the movement from the standby position to the printing position. In the course of the movement of the finger placement unit 504, the finger placement unit 503 starts to rise and the second nail 702 starts the movement from the standby position to the printing position. Thereafter, in the case where the finger placement unit 504 reaches the printing position, the printing on the first nail 701 by the print head 207 is started as shown in FIG. 15C. During this period, the finger placement unit 503 is in the course of the movement to the printing position. In the case where the printing on the first nail 701 is completed (see FIG. 15D), the finger placement unit 504 starts to descend as shown in FIG. 15E, and the first nail 701 moves from the printing position to the standby position. In the case where the second nail 702 reaches the printing position in the course of the movement of the finger placement unit 504, the printing on the second nail 702 by the print head 207 is started as shown in FIG. 15F. In the case where the printing on the second nail 702 is completed (see FIG. 15G), the finger placement unit 503 starts to descend as shown in FIG. 15H, and the second nail 702 moves from the printing position to the standby position.

The present embodiment has described the example of starting the printing from the state where both the first nail 701 and the second nail 702 are located at the standby positions. However, the present invention is not limited only to this configuration and is also applicable to the printing operation in which the printing is started from the state where both the first nail 701 and the second nail 702 are located at the printing positions as described in the first embodiment with reference to FIG. 14A. In the meantime, the present embodiment is configured to delay the start of movement of the finger placement unit 503 from the start of movement of the finger placement unit 504 so as to cause the second nail 702 to reach the printing position later than the first nail 701. Without limitations to the foregoing, the present invention may be configured to slow down a movement speed of the finger placement unit 503 as compared to a movement speed of the finger placement unit 504 so as to cause the second nail 702 to reach the printing position later than the first nail 701 instead of delaying a timing to start the movement.

As described above, it is possible to reduce the time required for printing on the nails by moving one of the finger placement unit 504 and the finger placement unit 503 in the course of moving the other.

Third Embodiment

A third embodiment of the present invention will be described below with reference to the drawings. Since basic configurations of the present embodiment are the same as those of the first embodiment, the following description will be focused on characteristic configurations of the present embodiment.

As mentioned above, the printing apparatus 20 specifies the rough positions of the nails by shooting the nails with the shooting unit 204 in the state where the hand is placed on the hand placement unit 205. However, reflection light may be caught in the course of shooting the nails and accuracy in obtaining shapes of the nails may be deteriorated as a consequence. In other cases, the reflection light may hinder the obtainment of the nail shapes. Given the circumstances, the present embodiment is configured to suppress the deterioration of accuracy in obtaining the nail shapes by providing the finger placement units with a regular reflection prevention unit.

Figure 16:
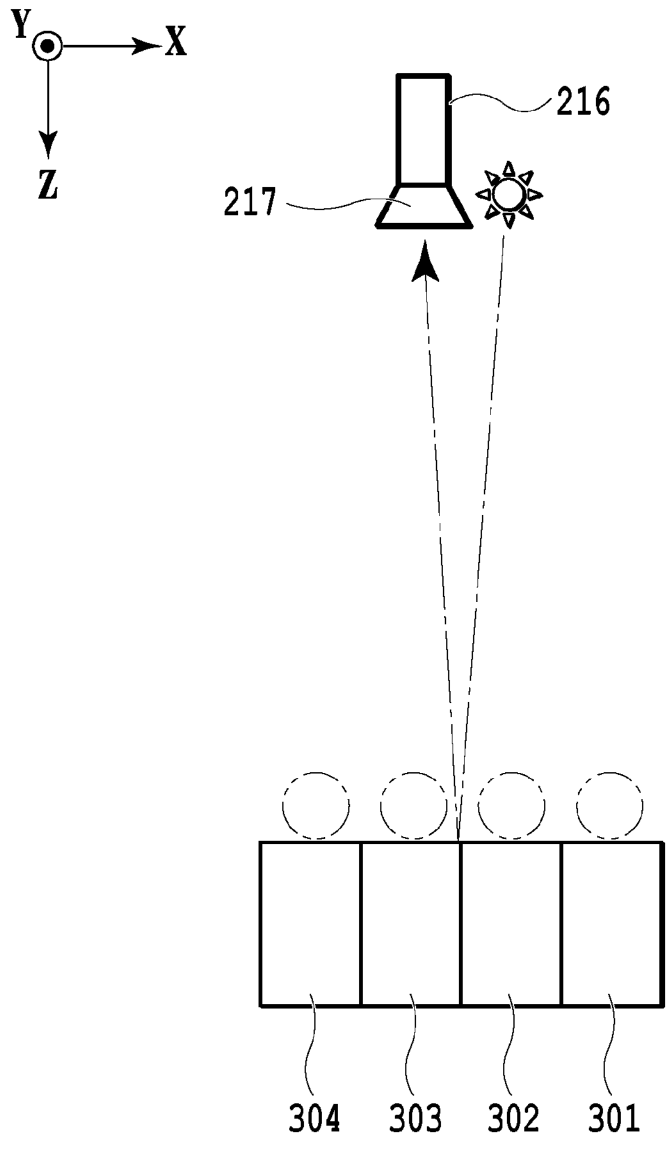
FIG. 16 is a diagram for explaining an effect of reflection light in a case of obtaining a nail shape.
Figure 17:
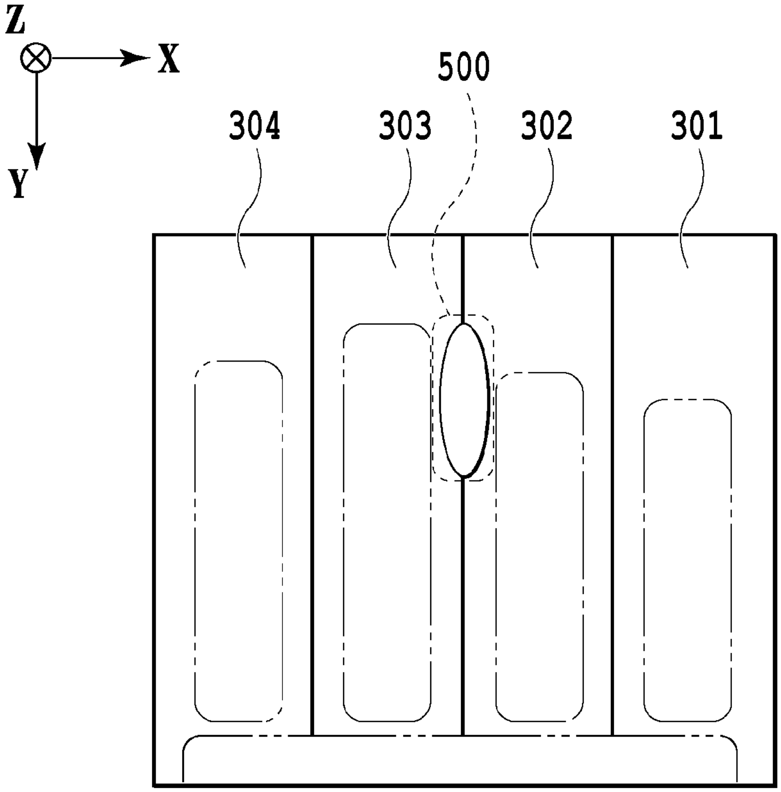
FIG. 17 is another diagram for explaining the effect of the reflection light in the case of obtaining the nail shape.

FIGS. 16 and 17 are diagrams for explaining an effect of the reflection light in a case of obtaining a nail shape. In the case where regular reflection light from a light source is incident on the camera 216 of the shooting unit 204, an obtained image may partially develop overexposure. In particular, in the case of placing two or more fingers on the finger placement units at the same time, the reflection light reflected by a space between the fingers is apt to be incident on the camera 216. FIG. 17 shows an example of an image shot in the state where the regular reflection light is incident on the camera 216. As shown in FIG. 17, the obtained image includes an overexposed portion 500 in which the image is partially whited out by the reflection light. The host 10 may erroneously recognize this overexposed portion 500 as a nail.

Figure 18:
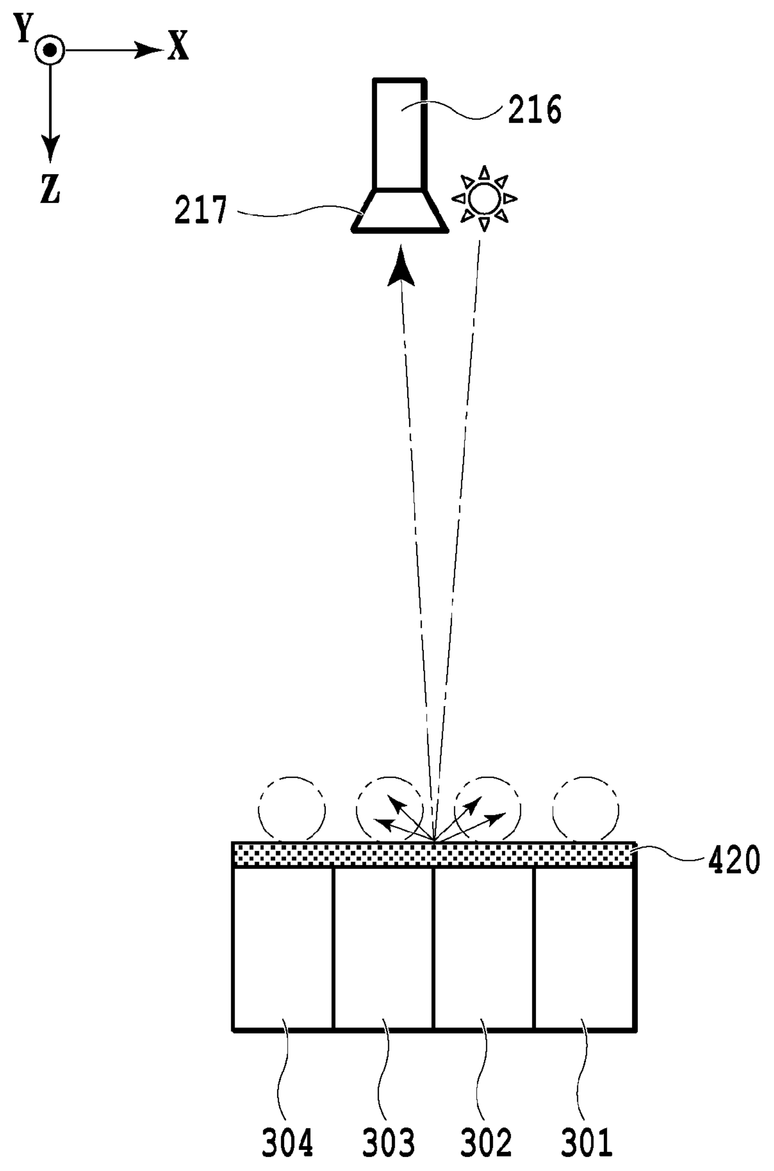
FIG. 18 is a diagram showing a regular reflection prevention unit provided to the finger placement unit.

FIG. 18 is a diagram showing a regular reflection prevention unit 420 provided to the finger placement unit. FIG. 18 shows two specific examples of the regular reflection prevention unit 420.

A first mode of providing the regular reflection prevention unit 420 is to form irregularities on the surface of the finger placement unit. Provision of irregularities on the surface generally brings about diffused reflection of the light incident on the surface, which can eventually reduce the regular reflection. To be more precise, it is possible to adopt matting coating to provide the surface with irregularities by coating paint containing large particles of a pigment, for example. Meanwhile, it is also possible to use texturing such as edging, rough polishing, and transfer in the course of molding.

In the case of providing the finger placement unit with the irregularities, it is assumed that sebum and sweat may enter such irregular portions. Adhesion of the inks ejected from the above-described print head 207 is also conceivable. Given the circumstances, a transparent coating may be applied from above the surface provided with the irregularities. By providing the coating and smoothing the surface, stains adhering to the surface can be easily wiped off. Moreover, since the light is not projected on portions in contact with the fingers, the regular reflection prevention unit 420 may be provided at portions other than the portions in contact with the fingers. From the viewpoint of securing electric conductivity to the finger placement units, it is effective to provide the regular reflection prevention unit at the portions other than the portions in contact with the fingers.

A second mode of providing the regular reflection prevention unit 420 is to overlay cloth or paper on the finger placement units. In general, the cloth or the paper has less gloss than the metal surface does, and can therefore be suitably used as the regular reflection prevention unit. In the case of overlaying the cloth or the paper, the cloth or the paper is preferably fixed so as not to move together with the fingers placed on the regular reflection prevention unit 420 during the printing on the nails.

The regular reflection prevention unit 420 may adopt a structure other than the foregoing examples as long as such a structure can prevent the regular reflection.

Figure 19A:
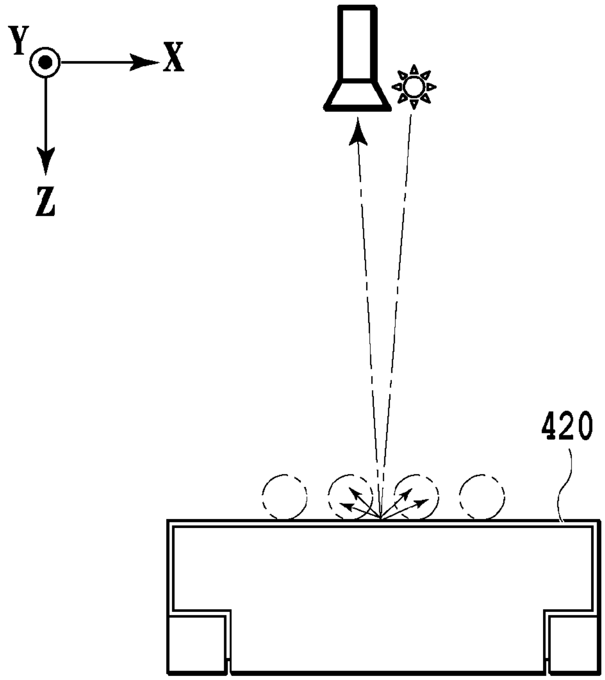
FIG. 19A is a diagram showing a method of fixing the regular reflection prevention unit.
Figure 19B:
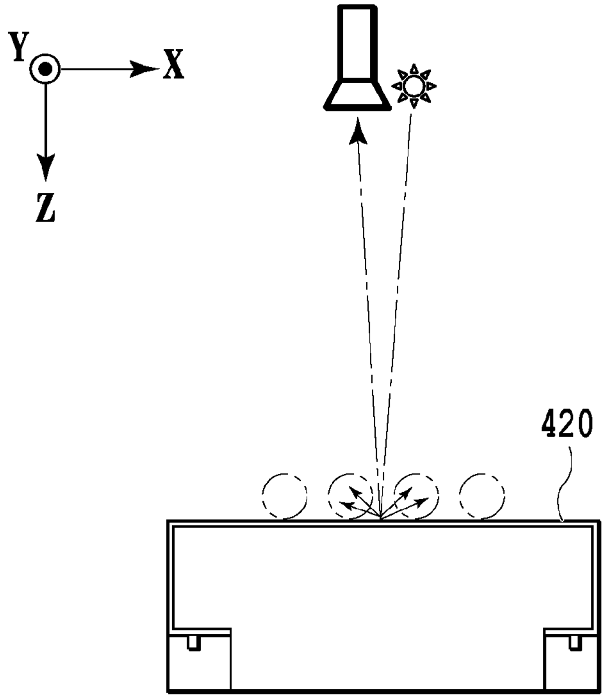
FIG. 19B is another diagram showing the method of fixing the regular reflection prevention unit.

FIGS. 19A and 19B are diagrams showing methods of fixing the regular reflection prevention unit 420. Examples of the methods of fixing the regular reflection prevention unit 420 include a method of holding the regular reflection prevention unit 420 while placing a frame around the regular reflection prevention unit 420 as shown in FIG. 19A, and a method of piercing fixation pins into holes provided in the cloth or the paper as shown in FIG. 19B.

Here, the cloth or the paper is preferably replaceable so as to keep the regular reflection prevention unit 420 clean against adhesion of the stain as mentioned above. In the case where there are two or more finger placement units, the cloth or the paper may be overlaid on each of the finger placement units or on all of the finger placement unit in block. Moreover, regular reflection prevention unit 420 is preferably black from the viewpoint of reducing the reflection. However, the regular reflection prevention unit 420 may be white so as to make the overexposed portion in the image due to the regular reflection less noticeable, or may be of a color (such as green and blue) that is not contained in the human skin.

Fourth Embodiment

A fourth embodiment of the present invention will be described below with reference to the drawings. Since basic configurations of the present embodiment are the same as those of the first embodiment, the following description will be focused on characteristic configurations of the present embodiment.

Figure 20:
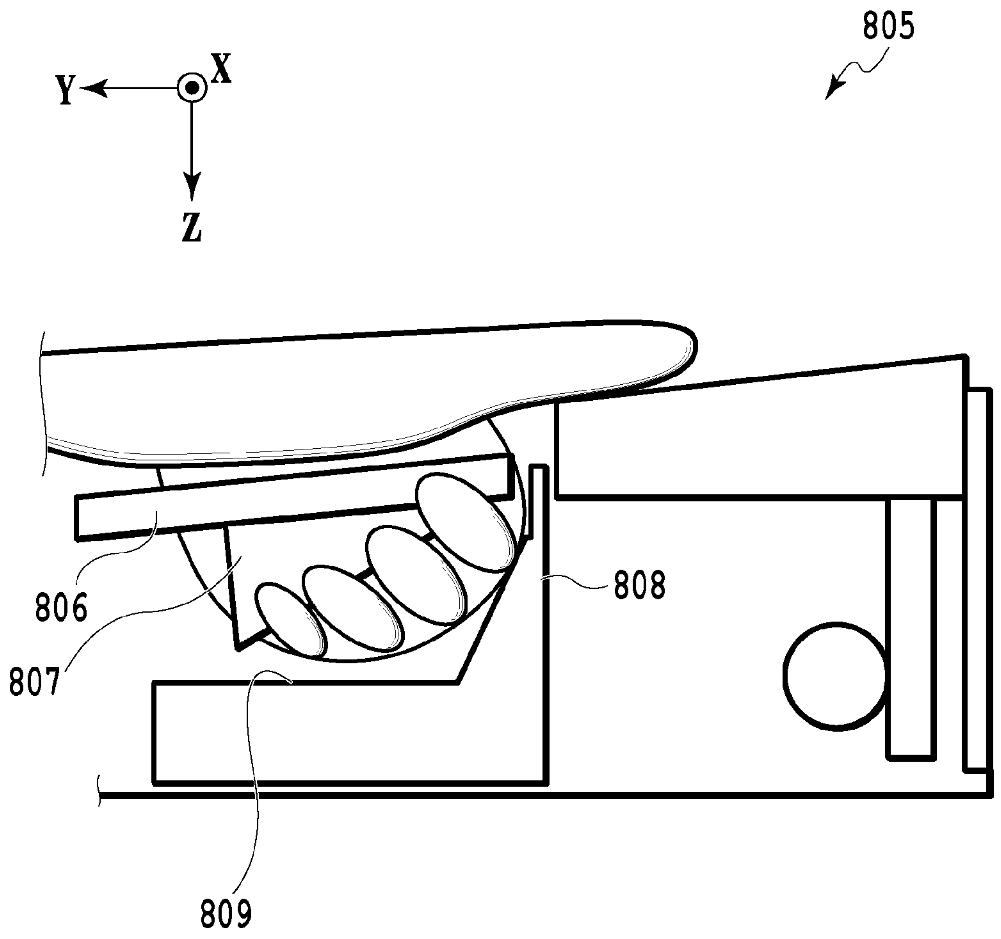
FIG. 20 is a side sectional view showing a hand placement unit.

FIG. 20 is a side sectional view showing a hand placement unit 805 of the present embodiment. FIG. 20 shows a state of printing on a nail of a thumb of a left hand. The finger placement unit may be designed as a finger placement unit exclusive for the thumb. In the case of designing the finger placement unit exclusive for the thumb, it is preferable to provide a height adjustment mechanism that moves the finger placement unit in the direction of the arrow z.

In the case of printing on the nail of the thumb, a thenar of the hand having the thumb with the nail to be printed is placed on a palm placement unit 806. During the printing, the nail of the thumb needs to be oriented upward and the posture of the nail needs to be stabilized in the state where the thenar is placed on the palm placement unit 806. Accordingly, the palm and the hand are allowed to make a loose first in the case of printing on the nail of the thumb. To this end, the palm placement unit 806 is provided with a handle 807 located below a surface to place the thenar on and designed to be held with the palm and the fingers (the hand) in the state of making the loose fist. Meanwhile, it is possible to stabilize the posture of the nail even better by providing a finger rest 808 that can be thrust with the joint at the base of the index finger or other parts of the fingers. In this case, the finger rest 808 is formed as an elastic component so as to reduce the user's pain and to place the hand more stably. Meanwhile, it is possible to stabilize the posture of the nail even better by providing a little-finger rest 809 that can be thrust with the little finger or the joint at the base of the little finger.

Figure 21:
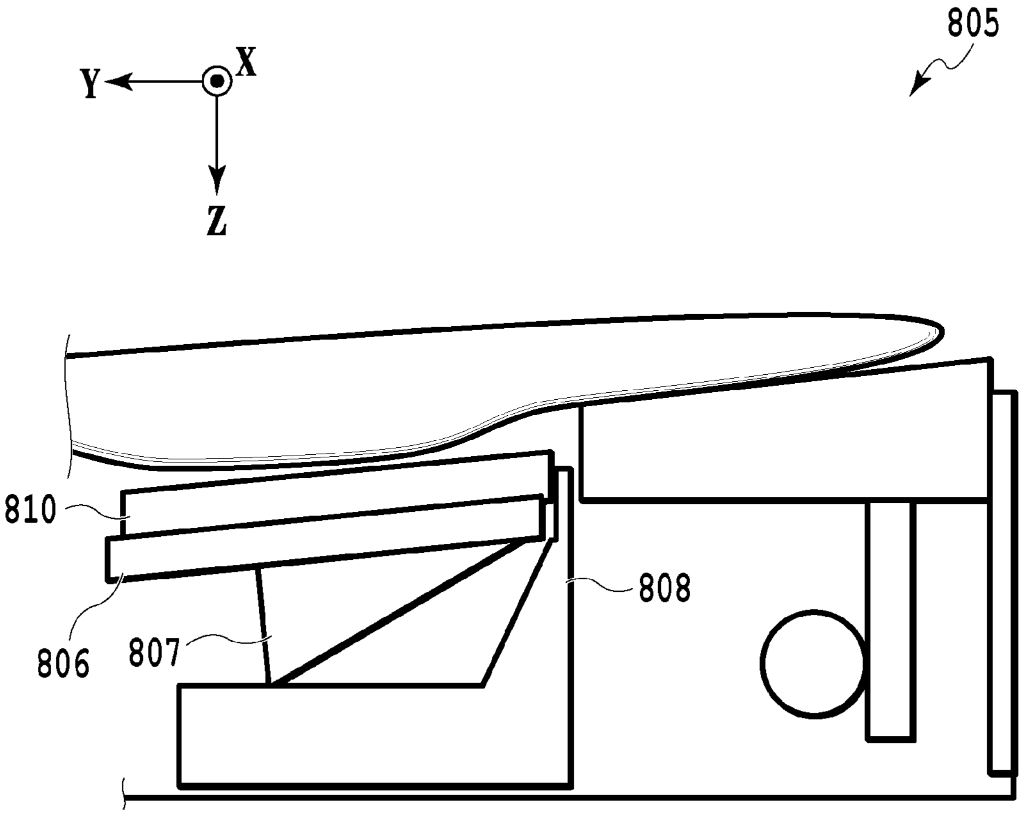
FIG. 21 is a side sectional view showing a modified example of the hand placement unit.

FIG. 21 is a side sectional view showing a modified example of the hand placement unit 805 of the present embodiment. The hand placement unit 805 may be provided with a palm placement member 810 in a plate shape exclusive for use in the case of printing on the nail of the finger other than the thumb. The palm placement member 810 may be detachably installed at an upper part of the palm placement unit 806. Alternatively, by connecting the palm placement member 810 to the palm placement unit 806 with a hinge or the like, the palm placement member 810 can be used as the palm placement unit 806 in the case of printing on the nail of the thumb by moving the palm placement member 810 in an opening manner.

A hand of a person usually has variable thickness in an area from the thenar to the thumb. Therefore, in the case of printing on the nail of the thumb, it is easier to stabilize the posture of the thumb by providing a slight difference in height between a portion to support the thenar and a portion to support the thumb. On the other hand, in the case of printing on the nail of the finger other than the thumb, it is easier to stabilize the posture of the finger by providing little difference in height between the portion to support the palm and a portion to support the finger. Accordingly, in the modified example of the present embodiment, the difference in height is provided to the portion to support the palm (the thenar) by using the palm placement member 810 so as to deal with the case of printing on the nail of the thumb and the case of printing on the nail on the finger other than the thumb. This configuration makes it possible to perform the printing while stabilizing the posture of every finger.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-053659 filed Mar. 26, 2021, which is hereby incorporated by reference herein in its entirety.

What is claimed is:

1. A printing apparatus comprising:

a printer configured to perform printing on a first target object and a second target object by ejecting a liquid in a first direction;

a first finger holder on which the first target object is placeable;

a second finger holder on which the second target object is placeable;

a first adjustor configured to adjust a first distance in the first direction between the first target object placed on the first finger holder and the printer;

a second adjustor configured to adjust a second distance in the first direction between the second target object placed on the second finger holder and the printer; and a controller configured to control at least one of the first adjustor and the second adjustor such that the first distance is smaller than the second distance in a case of printing on the first target object, wherein each of the first adjustor and the second adjustor use a motor as a drive source, with the first adjustor and the second adjustor using the same motor as the drive source.

2. The printing apparatus according to claim 1, wherein the controller controls the first adjustor in the case of printing on the first target object.

3. The printing apparatus according to claim 1, wherein the controller controls the second adjustor in the case of printing on the first target object.

4. The printing apparatus according to claim 1, wherein the controller controls the first adjustor and the second adjustor in parallel.

5. The printing apparatus according to claim 1, wherein the first target object is a first nail, a first finger having the first nail is placed on the first finger holder, and the first finger holder includes an inclined surface inclined such that a position of a tip of the first finger becomes higher than a position of a base of the first finger in a state where the first finger is placed on the first finger holder.

6. The printing apparatus according to claim 5, wherein an angle of the inclined surface is larger than 0 degrees and smaller than 30 degrees.

7. The printing apparatus according to claim 5, wherein the first finger holder includes a groove formed in a surface on which the first finger is to be placed.

8. The printing apparatus according to claim 7, wherein the groove is a groove having a U-shaped cross-section.

9. The printing apparatus according to claim 7, wherein the groove is a groove having a V-shaped cross-section.

10. The printing apparatus according to claim 5, wherein the first finger holder includes projections provided to two side ends of a surface on which the first finger is placed.

11. The printing apparatus according to claim 5, further comprising:

a camera configured to shoot an image of the first nail placed on the first finger holder, wherein the first finger holder includes a regular reflector located on a surface on which the first finger is placed and configured to prevent regular reflection of light.

12. The printing apparatus according to claim 5, further comprising:

a palm holder on which a palm of a hand including the first nail is placeable.

13. The printing apparatus according to claim 12, wherein the palm holder includes a handle located below a surface on which the palm is placed and configured to be held with the hand.

14. The printing apparatus according to claim 12, wherein the palm holder includes a plate-shaped palm placement member, and the palm placement member is detachable.

15. The printing apparatus according to claim 14, wherein the palm holder is bendably connected to the plate-shaped palm placement member.

16. The printing apparatus according to claim 1, wherein the printer is mounted on a carriage configured to move in a direction intersecting with the first direction.

17. A controlling method for a printing apparatus including a printer configured to perform printing on a first target object and a second target object by ejecting a liquid in a first direction, a first finger holder on which the first target object is placeable, a second finger holder on which the second target object is placeable, a first adjustor configured to adjust a first distance in the first direction between the first target object placed on the first finger holder and the printer, and a second adjustor configured to adjust a second distance in the first direction between the second target object placed on the second finger holder and the printer, wherein each of the first adjustor and the second adjustor use a motor as a drive source, with the first adjustor and the second adjustor using the same motor as the drive source, the controlling method comprising the step of:

controlling at least one of the first adjustor- and the second adjustor such that the first distance is smaller than the second distance in a case of printing on the first target object.

* * * * *